UNITED STATES PATENT OFFICE 2,540,641

PROCESS OF PRODUCING INDENE MODIFIED PHENOL FORMALDEHYDE RESINS

Harry L. Allen, Philadelphia, Pa., and Earl G. Kerr, Haddonfield, N. J., assignors to Allied Chemical & Dye Corporation, New York, N. Y., a corporation of New York No Drawing. Application July 9, 1946, Serial No. 682,312

7 Claims. (Cl. 260—43)

This invention relates to the production of resinous materials suitable for use in the manufacture of varnishes and other coatings.

It is an object of this invention to provide a process for producing a resinous material suitable for manufacturing varnishes and other coatings, which resinous material imparts to films or coatings containing the same, the property of being resistant to acids and alkalies, and which process is comparatively simple to carry out employing available and comparatively inexpensive starting materials.

We have now found that by mixing an oil fraction containing indene or indene and other polymerizables such as one or more of the polymerizables, coumarone, coumarone homologs and indene homologs, the indene, however, being the chief polymerizable constituent, with a formaldehyde resinifying agent and a substituted phenol of the group consisting of (1) paracresol, (2) orthocresol, (3) xylenols the methyl substituents of which are predominantly positioned in either the ortho or para positions with respect to the hydroxyl group, and (4) mixtures containing two or more of the substituted phenols, paracresol, orthocresol and such xylenols, and heating the resultant mixture in the presence of an acid catalyst, at a temperature of from 90° to 105° C., a high yield of a resinous material is obtained, which resinous material is soluble in benzol, compatible with linseed, China-wood and other drying oils, and which, when blended with such drying oils and the resultant blend, is brushed, sprayed or otherwise applied to a surface, produces films which are resistant to acids and alkalies.

The process of this invention may readily be carried out by simply mixing the reactants with the catalyst and heating the resultant mixture. Thus, our process is a one-step process which can be practiced industrially with a minimum of care and labor since it is only necessary to mix the reactants in predetermined proportions, heat the mixture to the desired temperature and isolate the reaction product from the resulting reaction mixture, which isolation can readily be effected by subjecting the reaction mixture to distillation under vacuum.

The reactants are preferably mixed in the proportions of from 1 to 50 parts of polymerizable constituents present in the oil fraction, to from 50 to 100 parts by weight of substituted phenol and from 50 to 100 parts by weight of a 37% solution of formaldehyde resinifying agent, corresponding to 18.5 to 37 parts by weight of formaldehyde. The preferred proportions are from 10 to 30 parts of polymerizable constituents present in the oil fraction to from 70 to 90 parts by weight of substituted phenol and from 60 to 80 parts by weight of a 37% solution of formaldehyde resinifying agent corresponding to 22 to 30 parts by weight of formaldehyde.

The reaction mixture may be heated to from 90° to 105° C., preferably the reaction is carried out at a temperature of from 96° to 102° C. The time of the reaction will, of course, depend on the size of the charge, the particular temperature employed, etc. In general, a reaction time of one-half to one hour will be found adequate when the reaction is carried out at about 98° C. The catalyst used may be any desirable acid polymerization catalyst, such, for example, as sulfuric, hydrochloric, phosphoric or sulfonic acids. Sulfuric acid has been found particularly advantageous. From 0.3 to 1.5 parts by weight of sulfuric acid may be used for each 100 parts of total polymerizables (substituted phenol plus resinifiables in the oil fraction).

The indene-containing oil may be an indene-containing oil of commerce, such as those obtained by fractional distillation of coal tar oils, drip oils, carburetted water-gas tar oils, oil-gas tar oils, and light oils removed by scrubbers in coal gas and water gas operations, containing non-indene oils such as tri- and tetra-methyl benzenes, and other alkylated benzenes, and also paraffinic hydrocarbons. An oil boiling within the range of 160° to 200° C. and containing from 40% to 70% by weight indene and of one or more of the polymerizables, coumarone, coumarone homologs and indene homologs but in which the indene predominates, is preferably employed.

The orthocresol used may be the orthocresol of commerce having minimum melting points of 30.4° C., 30° C. or 29° C. The paracresol may be either of the two commercial grades available, namely, one containing from 92% to 94% paracresol melting at not lower than 28.6° C. and the other containing 98%–100% paracresol and melting at not lower than 33° C. Ortho or paracresol containing even greater quantities of impurities than those above mentioned, as long as they contain preponderating amounts of either orthocresol or paracresol or both, may be used. The xylenols, predominantly substituted in either the ortho or para position with respect to the hydroxyl group, may be the xylenol fractions boiling within the range of 210° to 217° C. obtained in the fractional distillation of tar acid oils recovered from coal tar, or a somewhat higher boiling fraction, namely, one boiling within the range of 217° to 223° C. or 223° to 232° C. The 217°-223° C. fraction contains a considerable amount of metaxylenol; it contains, however, a preponderating amount of xylenols substituted in the ortho and para position with respect to the hydroxyl group. It will be noted that both the substituted phenolic reactant and the resin oil, employed in carrying out the process of this invention, are readily available commercial materials, considerably less expensive than the relatively pure phenolic and polymerizable reactants heretofore suggested for use in making modified phenol formaldehyde resins.

It is important to employ orthocresol, paracresol or a xylenol predominantly substituted in either the ortho or para position with respect to the hydroxyl group because by so doing a substantially uniform rate of reaction is obtained between the substituted phenol and the formaldehyde on the one hand and the polymerizables including the indene polymerizables and the formaldehyde on the other and a resin complex in high yield results.

Instead of formaldehyde, similarly acting derivatives thereof, such as paraformaldehyde may be employed as the resinifying agent.

Employing the reactants hereinabove set forth in the proportions indicated, heating them within the temperature range stated, preferably under atmospheric pressure, although the reaction may be carried out under superatmospheric pressure conditions, a reaction mixture is produced from which may be isolated by distillation a solid resin having a melting point within the range of 75° to 150° C. The resultant resin is soluble in benzol but insoluble in ethyl alcohol and in petroleum thinner. It is compatible with drying oils such as linseed and China-wood oils, to produce a coating material which may be thinned with petroleum thinner and which dries to produce hard, firm films resistant to acids and alkalies.

The following examples are illustrative of the invention. It will be understood, however, the invention is not limited to these examples. In the examples, all parts are by weight. All melting points of resins are cube in mercury.

*Example 1.*—240 parts of paracresol were mixed with 100 parts of an indene oil boiling within the range of 160° to 200° C. containing 60 parts of polymerizables, 207 parts of a 37% solution of formaldehyde, and 5.7 parts of 20% sulfuric acid solution. The mixture was heated for one-half hour at 98° C., and then subjected to vacuum distillation under a vacuum of 27½ inches of mercury. The peak temperature reached during the distillation was 145° C. 296 parts of the resin were produced as still residue representing a yield of 98.7% having a melting point of 143° C.

*Example 2.*—180 parts of paracresol were mixed with 200 parts of an indene oil boiling within the range of 160° to 200° C. containing 120 parts of polymerizables and 155 parts of 37% formaldehyde solution. 5.7 parts of 20% sulfuric acid were incorporated in the mixture. It was heated for three-quarters of an hour at 98° C. and then subjected to vacuum distillation under a vacuum of 28 inches of mercury, the peak temperature reached in the distillation being 170° C. 285 parts of resin representing a yield of 95.0% were produced as still residue having a melting point of 78° C.

*Example 3.*—120 parts of paracresol were mixed with 300 parts of an indene oil boiling within the range of 160° to 200° C. containing 180 parts of polymerizables and 103 parts of 37% formaldehyde solution. 5.7 parts of sulfuric acid were incorporated in the mixture. It was heated for one hour at 98° C. and then subjected to vacuum distillation under vacuum of 28½ inches of mercury, the peak temperature reached during the distillation being 170° C. 265 parts of resin representing a yield of 88.5% were produced, having a melting point of 85° C.

*Example 4.*—75 parts of orthocresol were mixed with 48.5 parts of an indene oil boiling within the range of 160° to 200° C. containing 25 parts of polymerizables, 61.5 parts of a 37% solution of formaldehyde, and 5 parts of a 20% sulfuric acid solution. The mixture was heated for one hour at 98° C. and then subjected to vacuum distillation under vacuum of 29″ of mercury. The peak temperature reached during the distillation was 145° C. 107.5 parts of resin were produced having a melting point of 124° C.

*Example 5.*—75 parts of a xylenol fraction boiling within the range of 210° to 217° C., the xylenols of which were predominantly substituted in either the ortho or para position with respect to the hydroxyl group, were mixed with 48.5 parts of an indene oil boiling within the range of 160° to 200° C., containing 25 parts of polymerizables, 61.5 parts of a 37% solution of formaldehyde and 5 parts of a 20% sulfuric acid solution. The mixture was heated for one hour at 98° C. and then subjected to vacuum distillation under a vacuum of 29″ of mercury. The peak temperature reached during the distillation was 145° C. 107 parts of resin were produced having a melting point of 124° C.

*Example 6.*—75 parts of a xylenol fraction, the xylenols of which were predominantly substituted in either the ortho or para position relative to the hydroxyl group, boiling within the range of 217° to 223° C. were mixed with 48.5 parts of an indene oil boiling within the range of 160° to 200° C., containing 25 parts of polymerizables, 61.5 parts of 37% solution of formaldehyde and 5 parts of a 20% sulfuric acid solution. The mixture was heated for three-quarters of an hour at 98° C. and then subjected to vacuum distillation under a vacuum of 28½″ of mercury. The peak temperature reached during the distillation was 135° C. 109.3 parts of resin were produced having a melting point of 135° C.

*Example 7.*—75 parts of a xylenol fraction, the xylenols of which were predominantly substituted in either the ortho or para position with respect to the hydroxyl group, boiling within the range of 222° to 232° C. were mixed with 48.5 parts of an indene oil boiling within the range of 160° to 200° C. containing 25 parts of polymerizables, 61.5 parts of a 37% solution of formaldehyde and 5 parts of a 20% sulfuric acid solution. The mixture was heated for one-half hour at 98° C. and then subjected to vacuum distillation under a vacuum of 28¾″ of mercury. The peak temperature reached during the distillation was 145° C. 105.5 parts of resin were produced, having a melting point of 143° C.

The resins produced in the first three examples were found to be soluble in benzol but insoluble in alcohol and petroleum thinner. They were compatible with linseed oil and China-wood oil. Upon heating a mixture containing 50 parts resin and (a) 50 parts of China-wood oil and (b) 50 parts of linseed oil, materials were produced which were thinned with petroleum thinner. The resultant varnishes when applied to test panels formed hard, tough films resistant to acids and alkalies.

The resins produced in Examples 4 to 7 inclusive, when cooked with drying oils, resulted in satisfactory varnishes.

Since certain changes may be made in the invention without departing from the scope thereof, it is intended that all matter contained in the above description shall be interpreted as illustrative and not in a limiting sense.

What is claimed is:

1. The process of producing a resinous material suitable for use as a varnish base which comprises heating at a temperature of from 90° to 105° C. a mixture consisting of an oil fraction containing indene as the chief polymerizable constituent, formaldehyde, an acid catalyst for catalyzing the polymerization of indene and a substituted phenol of the group consisting of paracresol, orthocresol, xylenols the methyl substituents of which are predominantly positioned in the ortho positions with respect to the hydroxyl group, xylenols having one methyl substituent predominantly positioned in the para position and the other predominantly positioned in an ortho position with respect to the hydroxyl group, mixtures of such xylenols, mixtures of such xylenols with paracresol and mixtures of such xylenols with orthocresol and mixtures of paracresol and orthocresol, in the proportion of from 1 to 50 parts of polymerizable constituents present in the oil fraction to from 50 to 100 parts of the substituted phenol and from 18.5 to 37 parts of formaldehyde, and isolating the resinous material from the resultant reaction product.

2. A process as defined in claim 1 in which the heating is carried out in the presence of sulfuric acid as the acid catalyst for catalyzing the polymerization of indene.

3. The process of producing a resinous material suitable for use as a varnish base which comprises heating at a temperature of from 90° to 105° C. a mixture consisting of an oil fraction containing indene as the chief polymerizable constituent, formaldehyde, a substituted phenol of the group consisting of paracresol, orthocresol, xylenols the methyl substituents of which are predominantly positioned in the ortho positions with respect to the hydroxyl group, xylenols having one methyl substituent predominantly positioned in the para position and the other predominantly positioned in an ortho position with respect to the hydroxyl group, mixtures of such xylenols, mixtures of such xylenols with paracresol and mixtures of such xylenols with orthocresol and mixtures of paracresol and orthocresol, and sulfuric acid polymerization catalyst in the proportion of from 1 to 50 parts of polymerizable constituents present in the oil fraction; to from 50 to 100 parts by weight of the substituted phenol and from 18.5 to 37 parts by weight of formaldehyde and from .3 to 1.5 parts of sulfuric acid catalyst for each 100 parts of total polymerizable constituents, and subjecting the resultant reaction mixture to vacuum distillation to recover the resinous product.

4. The process of producing a resinous product which comprises heating at a temperature of from 90° to 105° C. a mixture consisting of an indene oil fraction boiling within the range of 160° to 200° C. and containing indene as the chief polymerizable constituent, paracresol, formaldehyde and sulfuric acid polymerization catalyst in the proportions of from 1 to 50 parts of polymerizable constituents present in the indene oil to from 50 to 100 parts by weight of paracresol and from 18.5 to 37 parts by weight of formaldehyde and from .3 to 1.5 parts of sulfuric acid polymerization catalyst for each 100 parts of total polymerizables, and subjecting the resultant reaction mixture to vacuum distillation to recover the resinous product.

5. The process of producing a resinous material suitable for use as a varnish base, which comprises heating at a temperature of from 90° to 105° C. a mixture consisting of an oil fraction containing indene as the chief polymerizable constituent, a material from the group consisting of formaldehyde and paraformaldehyde, a substituted phenol of the group consisting of paracresol, orthocresol, xylenols the methyl substituents of which are predominantly positioned in the ortho positions with respect to the hydroxyl group, xylenols having one methyl substituent predominantly positioned in the para position and the other predominantly positioned in an ortho position with respect to the hydroxyl group, mixtures of such xylenols, mixtures of such xylenols with paracresol, mixtures of such xylenols with orthocresol and mixtures of paracresol and orthocresol, in the proportion of from 1 to 50 parts of polymerizable constituents present in the oil fraction to from 50 to 100 parts by weight of substituted phenol and from 18.5 to 37 parts by weight of said material from the group consisting of formaldehyde and paraformaldehyde, and a small amount of an acid polymerization catalyst from the group consisting of sulfuric acid, hydrochloric acid, phosphoric acid and sulphonic acids and subjecting the resultant reaction mixture to vacuum distillation to recover the resinous material.

6. The process of producing a resinous material suitable for use as a varnish base, which comprises heating at a temperature of from 90° to 105° C. a mixture consisting of an oil fraction containing indene as the chief polymerizable constituent, formaldehyde, a substituted phenol of the group consisting of paracresol, orthocresol and xylenols the methyl substituents of which are predominantly positioned in the ortho positions with respect to the hydroxyl group, xylenols having one methyl substituent predominantly positioned in the para position and the other predominantly positioned in an ortho position with respect to the hydroxyl group, mixtures of such xylenols, mixtures of such xylenols with paracresol, mixtures of such xylenols with orthocresol and mixtures of paracresol and orthocresol and sulfuric acid polymerization catalyst in the proportion of from 10 to 30 parts of polymerizable constituents present in the oil fraction to from 70 to 90 parts by weight of substituted phenol, from 22 to 30 parts by weight of formaldehyde and from .3 to 1.5 parts by weight of sulfuric acid catalyst for each 100 parts of total polymerizable constituents, and subjecting the resultant reaction mixture to vacuum distillation to recover the resinous material.

7. The process of producing a resinous material suitable for use as a varnish base, which comprises heating at a temperature of from 90° to 105° C. a mixture consisting essentially of an oil fraction containing indene as the chief polymerizable constituent, a material from the group consisting of formaldehyde and paraformaldehyde, an acid polymerization catalyst and a substituted phenol of the group consisting of paracresol, orthocresol, xylenols the methyl substituents of which are predominantly positioned in the ortho positions with respect to the hydroxyl group, xylenols having one methyl substituent predominantly positioned in the para position and the other predominantly positioned in an ortho position with respect to the hydroxyl group, mixtures of such xylenols, mixtures of such xylenols with paracresol, mixtures of such xylenols with orthocresol, and mixtures of paracresol and orthocresol, in the proportion of from 1 to 50 parts of polymerizable constituents present in the oil fraction to from 50 to 100 parts by weight of substituted phenol and from 18.5 to 37 parts by weight of said material from the group consisting of formaldehyde and paraformaldehyde, and isolating the resinous material from the resultant reaction product.

HARRY L. ALLEN.
EARL G. KERR.

REFERENCES CITED

The following references are of record in the file of this patent:

UNITED STATES PATENTS

| Number | Name | Date |
|---|---|---|
| 1,945,719 | Apgar et al. | Feb. 6, 1934 |
| 2,050,188 | Lee et al. | Aug. 4, 1936 |
| 2,101,853 | Harvey | Dec. 14, 1937 |
| 2,329,671 | Ward | Sept. 14, 1943 |
| 2,423,415 | Soday | July 1, 1947 |
| 2,460,724 | Allen et al. | Feb. 1, 1949 |

FOREIGN PATENTS

| Number | Country | Date |
|---|---|---|
| 148,750 | Great Britain | Dec. 28, 1921 |
| 349,934 | Great Britain | May 28, 1931 |